US007368959B1

(12) United States Patent
Xu et al.

(10) Patent No.: US 7,368,959 B1
(45) Date of Patent: May 6, 2008

(54) VOLTAGE REGULATOR WITH SYNCHRONIZED PHASE SHIFT

(75) Inventors: Jun Xu, McKinney, TX (US); Zbigniew Lata, Plano, TX (US); Douglas M. Mattingly, Garner, NC (US); Bogdan M. Duduman, Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 141 days.

(21) Appl. No.: 11/427,654

(22) Filed: Jun. 29, 2006

Related U.S. Application Data

(60) Provisional application No. 60/721,458, filed on Sep. 28, 2005.

(51) Int. Cl.
*H03L 7/00* (2006.01)

(52) U.S. Cl. ...................................... 327/141; 327/540

(58) Field of Classification Search ................ 327/141, 327/538, 540, 541, 543
See application file for complete search history.

(56) References Cited

U.S. PATENT DOCUMENTS

| | | | | |
|---|---|---|---|---|
| 4,359,679 A * | 11/1982 | Regan | ........................ | 323/272 |
| 6,043,634 A * | 3/2000 | Nguyen et al. | ............. | 323/272 |
| 6,285,571 B1 * | 9/2001 | Brooks et al. | ................ | 363/65 |
| 6,674,274 B2 * | 1/2004 | Hobrecht et al. | ........... | 323/285 |
| 6,788,035 B2 * | 9/2004 | Bassett et al. | ............. | 323/272 |
| 6,819,577 B1 * | 11/2004 | Wiktor et al. | ................. | 363/72 |
| 7,215,102 B2 * | 5/2007 | Harris et al. | ................ | 323/268 |
| 2006/0125451 A1 * | 6/2006 | Tabaian et al. | ............. | 323/222 |
| 2006/0279350 A1 * | 12/2006 | Zhang et al. | .............. | 327/407 |

* cited by examiner

*Primary Examiner*—N. Drew Richards
*Assistant Examiner*—William Hernandez
(74) *Attorney, Agent, or Firm*—Gary R Stanford

(57) ABSTRACT

An IC incorporating a multiphase voltage converter with synchronized phase shift including a phase shift pin, a frequency select pin, a master clock pin, and a voltage regulator. The phase shift pin is coupled to a first voltage for a master mode or a first resistor for a slave mode. The frequency select pin is coupled to one of a second voltage and a second resistor. The master clock pin provides a master clock signal or receives an external clock signal. The IC provides the master clock signal at a frequency determined by the second resistor or otherwise at a default frequency. The voltage regulator operates in the slave mode at a phase shift relative to the external clock signal based on the first resistor and the second resistor or based on the first resistor and a default resistance if the second voltage is coupled.

20 Claims, 6 Drawing Sheets

PLL/DLL SOLUTION

VOLTAGE REGULATOR WITH SYNCHRONIZED PHASE SHIFT

CROSS-REFERENCE TO RELATED APPLICATIONS

This application claims the benefit of U.S. Provisional Application Ser. No. 60/721,458, filed on Sep. 28, 2005, which is herein incorporated by reference for all intents and purposes.

BACKGROUND OF THE INVENTION

1. Field of the Invention

The present invention relates to power electronics and power management, and more particularly to a voltage regulator with synchronized and linear clock phase shift for use in multiphase and multi-channel applications.

2. Description of the Related Art

Many current-based multiphase or multi-channel regulators are implemented on an integrated circuit (IC) or chip and employ an internal phase locked loop (PLL) or delay locked loop (DLL) to lock up with a master clock. A DLL is a first-order system which is preferred when the master clock has little or no frequency variation since it is somewhat easier to design and stabilize. A PLL is a second-order system which requires significant design effort. The PLL and DLL configurations must each be stabilized and compensated since they are both feedback loop systems. The PLL/DLL configuration only operates within a limited clock frequency range. Multiple pins are typically required to set the decoding logic to tap the correct phase shift angle position of the PLL/DLL line for each channel. A PLL/DLL configuration has relatively slow response time during start-up or frequency transition in order to synchronize with the master clock. The PLL/DLL configuration requires a significant amount of die and bias current. The number of channels is limited to the number of available taps of the PLL/DLL line.

It is desired to provide a voltage regulator which may operate within a relatively wide frequency range and which may be used in multiphase and multi-channel applications. It is desired that the multiphase or multi-channel voltage converter be relatively inexpensive to design and to implement using the voltage regulator for any suitable number of channels. It is desired to reduce the number of pins used for setting the phase shift angle for each slave device and to provide a linear phase shift angle adjustment. It is desired to reduce or otherwise eliminate stability and design issues and to achieve relatively fast response during start-up or frequency transition.

SUMMARY OF THE INVENTION

A clock synchronization circuit for a multiphase voltage regulator according to an embodiment of the present invention includes a first circuit having a mode select node, a second circuit having a frequency select node, and a third circuit coupled to a master clock node. The first circuit selects between a master mode and a slave mode and provides a mode select signal indicative thereof. The second circuit receives the mode select signal and provides a control signal indicative of frequency of a master clock signal for the master mode and indicative of a phase shift relative to the master clock signal for the slave mode. The third circuit provides the master clock signal on the master clock node with a frequency based on the control signal for the master mode, and generates a slave clock signal with the phase shift relative to the master clock signal received via the master clock node.

The first circuit may include a switch circuit and a first current generator. The switch circuit provides the mode select signal to indicate the master mode upon detection of a first control voltage above a first threshold voltage on the mode select node, and otherwise provides the mode select signal to indicate the slave mode. The first current generator develops a first current based on resistance of a first resistor when the first resistor is coupled to the mode select node.

The second circuit may include a second current generator and a current mirror circuit. The second current generator develops a second current based on a resistance of a second resistor when the second resistor is coupled to the frequency select node, and develops a predetermined reference current upon detection of a second control voltage above a second threshold voltage on the frequency select node. The current mirror circuit provides a control current as the control signal, where the control current is based on the first current when in the slave mode and when the first resistor is coupled to the mode select node, where the control current is based on the second current when in the master mode and when the second resistor is coupled to the frequency select node, and where the control current is based on the predetermined reference current upon detection of the second control voltage on the frequency select node.

The synchronization circuit may include a current trim circuit from trimming the control current. The current trim circuit may be programmable using at least one trim bit for selecting a binary weighted current.

The third circuit may include a capacitor receiving the control current, a comparator circuit, a second switch circuit and a reset circuit. The comparator circuit compares a voltage of the capacitor with a reference voltage and has an output providing a compare signal indicative thereof. The second switch circuit is responsive to the mode select signal and couples the output of the comparator circuit to the master clock node in the master mode and isolates the output of the comparator circuit from the master clock node in the slave mode. The reset circuit is coupled between the master clock node and the capacitor and discharges the capacitor when the master clock node is pulled to a predetermined logic level.

The capacitor may be implemented as a trim capacitor. The trim capacitor may be programmable using at least one trim bit for selectively coupling a binary weighted capacitor to a fixed capacitor.

The synchronization circuit may include the current mirror circuit and a ramp generator. The current mirror circuit provides a ramp control signal based on the second current when the second resistor is coupled and based on the predetermined reference current upon detection of the second control voltage on the frequency select node. The ramp generator has a first input coupled to the output of the comparator circuit, a second input receiving the ramp control signal, and an output providing a ramp signal having a frequency based on the master clock signal and a slope based on the ramp control signal.

An integrated circuit (IC) incorporating a multiphase voltage converter with synchronized phase shift according to an embodiment of the present invention includes a phase shift pin, a frequency select pin, a master clock pin, and a voltage regulator. The phase shift pin is selectively coupled to either a first voltage or a first resistor. The frequency select pin is selectively coupled to one of a second voltage and a second resistor. The master clock pin selectively provides a master clock signal or receives an external clock signal. The voltage regulator operates in a master mode if the first voltage is coupled to the phase shift pin and in a slave mode if the first resistor is coupled to the phase shift pin. The IC provides the master clock signal in the master mode at a frequency determined by the second resistor if coupled to the frequency select pin or at a default frequency if the second voltage is coupled to the frequency select pin. The voltage regulator operates in the slave mode if the first resistor is coupled to the phase shift pin at a phase shift relative to the external clock signal. The relative phase shift is based on the first resistor and the second resistor if coupled to the frequency select pin or based on the first resistor and a default resistance if the second voltage is coupled to the frequency select pin.

The IC first and second voltages may be based on at least one voltage threshold. The IC may include a signal generator and an oscillator circuit. The signal generator provides a mode signal indicative of one of the master mode and the slave mode and generates a control signal indicative of one of the first frequency and the default frequency when the voltage regulator operates in the master mode or indicative of the phase shift when the voltage regulator operates in the slave mode. The oscillator circuit generates an internal clock signal based on the control signal. The internal clock signal is asserted as the master clock signal onto the master clock pin when in the master mode and the internal clock signal is shifted by the phase shift relative to the external clock signal received via the master clock pin when in the slave mode.

The control signal may be a current signal which charges a capacitor of the oscillator circuit. A current trim circuit may be provided for digitally trimming the current signal. The capacitor may be configured as a digitally adjustable capacitor. The IC may include a ramp generator which generates a ramp signal based on the internal clock signal having a slope based on the second resistor if coupled to the frequency select pin or based on the default resistance if the second voltage is coupled to the frequency select pin.

A method of configuring a multiphase voltage regulator IC with synchronized phase shift according to an embodiment of the present invention includes configuring a first pin of the IC to select between a master mode and a slave mode of operation and for programming a phase shift for the slave mode of operation, configuring a second pin of the IC to select a frequency of operation, generating an internal clock signal, providing the internal clock signal as a master clock signal on a third pin of the IC at a selected frequency in the master mode of operation, and receiving an external master clock signal and operating the internal clock signal at a frequency based on the external master clock signal at the programmed phase shift in the slave mode of operation.

The method may include detecting a voltage level applied to the first pin above a predetermined threshold voltage to select the master mode of operation and otherwise to select the slave mode of operation, and applying a predetermined voltage across a resistor coupled to the first pin to generate a current indicative of the programmed phase shift if the slave mode of operation is selected. The method may include detecting a voltage level above a predetermined threshold voltage applied to the second pin for selecting a default frequency of operation, and applying a predetermined voltage across a resistor coupled to the second pin to generate a current used to program the frequency of operation. The method may include asserting trim bits to control an internal current level and an internal capacitance of the IC for controlling frequency of operation.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
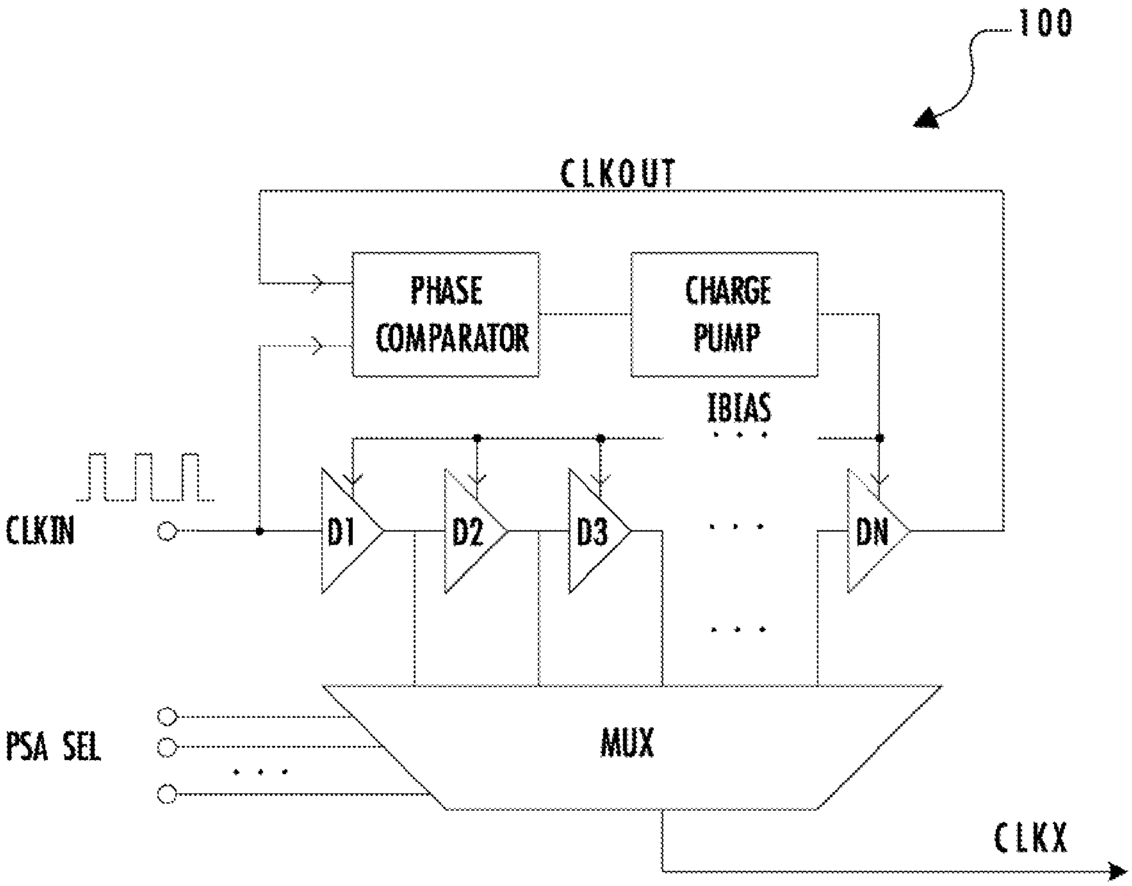
FIG. 1 is a simplified block diagram of a conventional PLL/DLL circuit.

FIG. 1 is a simplified block diagram of a conventional PLL/DLL circuit 100. An input clock CLKIN is provided to an input of a series of N delay devices D1, D2, D3, . . . , DN, in which the last device DN has an output providing a delayed output clock CLKOUT. Each delay device D1-DN is configured as a buffer or inverter or the like as known to those skilled in the art. The clock signals CLKIN and CLKOUT are provided to an input of a phase comparator, having an output coupled to an input of a charge pump. The charge pump develops a bias current IBIAS, which is provided to each of the delay devices D1-DN. The phase comparator and charge pump operate to synchronize the input and output clock signals and the series of delay devices D1-DN form a series of intermediate nodes providing a corresponding one of a plurality of phase shifted clock signals. A multiplexer (MUX) forms select logic which has multiple signal inputs, each coupled to a corresponding one of the intermediate nodes of the delay devices D1-DN, and has select inputs receiving phase shift angle select (PSA SEL) signals. The MUX has an output providing a clock signal CLKX selected by the PSA SEL signals.

The conventional PLL/DLL circuit 100 is configured as either a first-order or second-order feedback system, which must be stabilized and compensated. The PLL/DLL circuit 100 only operates within a limited clock frequency range. If a larger frequency range is desired, additional PLL/DLL loops must be included. In a multiphase configuration, multiple pins are required to provide the PSA SEL signals to tap the correct phase shift angle position of the PLL/DLL line for each channel. The PLL/DLL circuit 100 has relatively slow response time during start-up or frequency transition in order to synchronize with the input (or master) clock signal CLKIN. Note, for example, that the phase comparator and charge pump must respond to any differential until the system stabilizes. The PLL/DLL circuit 100 requires a significant amount of die and bias current, and the number of channels is limited to the number of available inputs of the MUX.

It is common to convert an unregulated input voltage to a regulated output voltage using a voltage mode controlled synchronous DC-DC converter buck topology with trailing edge PWM modulation. Input current must be supplied by the input capacitor of the DC-DC converter. The root-mean-square (RMS) current drawn from the input capacitor and the ripple voltage across the input capacitor are key factors determining the selection of the input capacitor. The output capacitor usually is determined from the output ripple voltage specification, whose major influencing factor is the output inductor ripple current flowing through the effective series resistance of the output capacitor.

While no hard-and-fast power limit exists for a single phase buck regulator, the advantages of designing with multiphase converters becomes apparent. These advantages include: reduced input ripple current, substantially decreasing the number of input capacitors; reduced output ripple voltage due to an effective multiplication of the ripple frequency; reduced component temperature achieved by distributing the losses over more components; and external components with reduced height. The key issue designers face when selecting input capacitors is input ripple current handling. Using a multiphase topology substantially reduces the input ripple current. The input capacitor of each phase conducts a lower amplitude input current pulse. Also, phase shifting increases the effective duty cycle of the current waveform, which results in a lower RMS ripple current.

Figure 2:
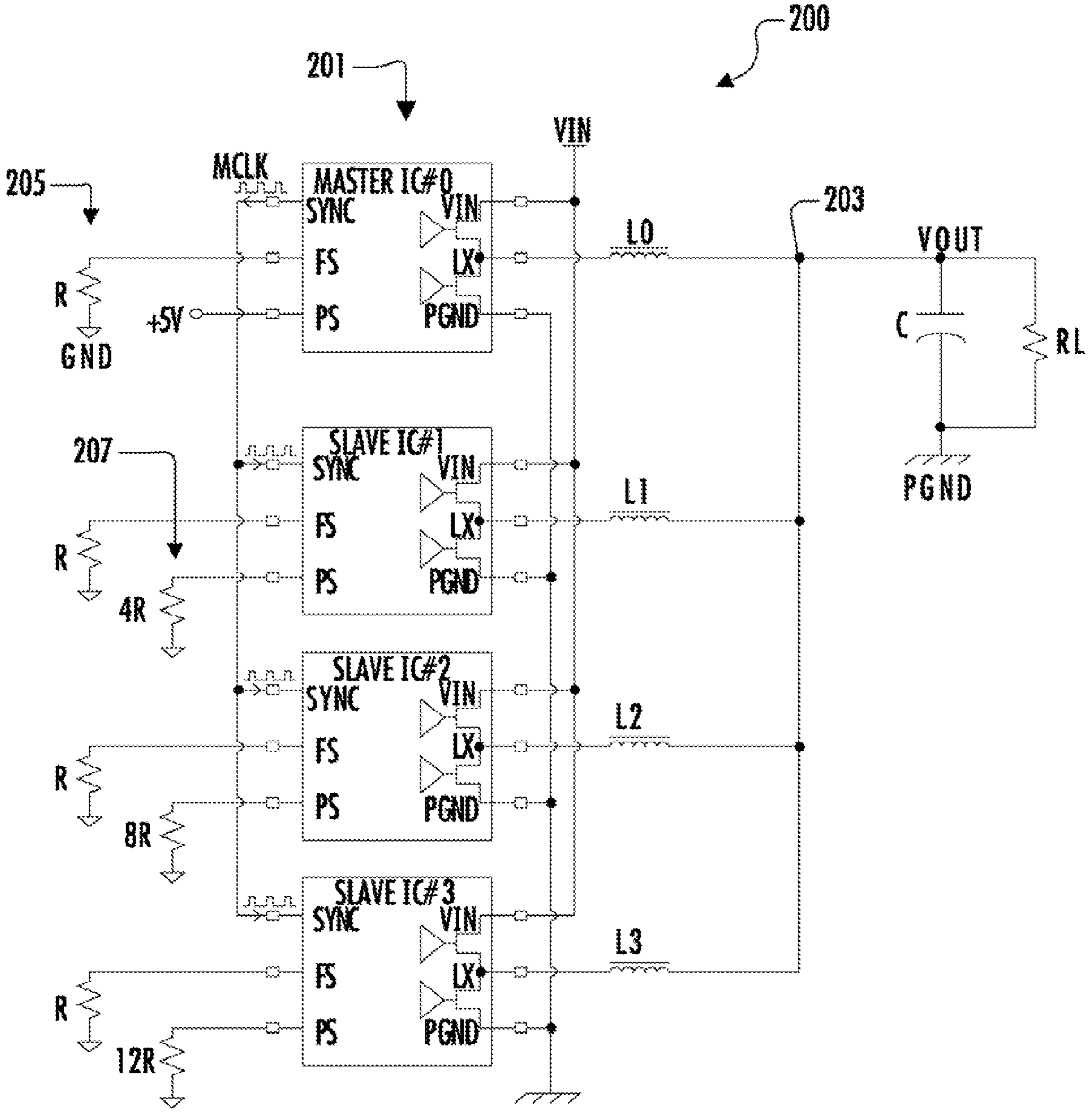
FIG. 2 is a simplified block diagram of a multiphase voltage converter implemented according to an exemplary embodiment of the present invention.

FIG. 2 is a simplified block diagram of a multiphase voltage converter 200 implemented according to an exemplary embodiment of the present invention. The multiphase voltage converter 200 illustrated includes 4 phases 0-3, each controlled by a corresponding one of 4 voltage regulators 201, individually labeled Master IC #0, Slave IC #1, Slave IC #2, and Slave IC #3. In the illustrated embodiment, each voltage regulator 201 is substantially identical and is configured as a buck-type regulator on an IC or chip. Each voltage regulator 201 includes an input voltage pin VIN coupled to an unregulated voltage supply voltage VIN, a power ground pin PGND coupled to a PGND node, and a phase node LX. The LX pin of each voltage regulator 201 is coupled to one end of a corresponding one of four inductors L0, L1, L2, and L3. The other end of each inductor L0-L4 is coupled together at a common output node 203 developing an output signal VOUT. An output capacitor C and a load resistor RL are shown coupled between output node 203 and PGND.

Each voltage regulator 201 operates to selectively switch its LX phase pin between VIN and PGND according to pulse width modulation (PWM) operation at a frequency level determined by a master clock signal MCLK. The PWM switching operation converts the higher unregulated supply voltage VIN to the regulated output voltage VOUT. The voltage regulators 201 are sequentially activated one at a time from the first master voltage regulator #0 to the last slave voltage regulator #3 and then back again to the master voltage regulator #0 in a round-robin fashion as understood by those skilled in the art. Each slave voltage regulator #1-3 operates relative to the master voltage regulator #0 at a selected phase angle as further described below. The phase angle is effectively determined by the total number of phases. For example, for a two-phase system, the pair of devices operate 180 degrees out of phase relative to each other, for a four-phase system, the four devices operate 90 degrees out of phase relative to each other, and so on. In this manner, the current load is shared among the multiple phases. The relative level of input ripple current and ripple voltage of the VOUT signal is determined by the total number of phases.

Each voltage regulator 201 includes a clock or synchronization pin SYNC, a frequency select pin FS, and a phase select pin PS. The FS pin of each voltage regulator 201 is coupled to one end of a corresponding one of 4 resistors 205, each resistor 205 having its other end coupled to a signal ground GND. In the illustrated embodiment, each of the resistors 205 has the same resistance R. The SYNC pins of all of the voltage regulators 201 are coupled together. The master voltage regulator #0 is configured as a master device in which it establishes the master switching clock MCLK, which is output on its SYNC pin. The remaining slave voltage regulators 201 are configured as slave devices which receive the MCLK signal at their SYNC pins as an input. The master voltage regulator #0 has its PS pin coupled to a fixed voltage level, which is +5 Volts (V) in the illustrated embodiment. The PS pin of each slave voltage regulator #1-3 is coupled to a corresponding one of multiple "phase select" resistors 207, each having its other end coupled to GND and having a resistance which establishes the relative phase of the respective slave device to the master as further described below. In the illustrated embodiment, the slave voltage regulator #1 has its PS pin coupled to a resistor 207 having a resistance 4R, the slave voltage regulator #2 has its PS pin coupled to a resistor 207 having a resistance 8R, and the slave voltage regulator #3 has its PS pin coupled to a resistor 207 having a resistance 12R.

The following table 1 illustrates exemplary configuration setups for the PS and FS pins for configuration the master and slave devices:

TABLE 1

External Master/Slave Configuration Logic

| Pin | | | |
|---|---|---|---|
| FS | PS | SYNC | Description |
| $R_T$ | +5 V | Clock Output | Master, Switching frequency is set by $R_T$: F = $C_C/R_T$ KHz. Clock outputs from SYNC pin to slaves' SYNC pins. |
| +5 V | +5 V | Clock Output | Master, Default 500 KHz switching frequency |
| $R_T$ | $R_P$ | Clock Input | Slave, Phase shift angle is set by $R_P$: PH = 1/16 ($R_P/R_T$) * 360. SYNC pin takes the clock from master IC. |
| +5 V | $R_P$ | Clock Input | Slave, Phase shift angle is set by RP: PH = 1/16 ($R_P/R_D$) * 360 SYNC pin takes the 500 KHz clock from master IC. |

where $R_D$ is a default resistor based on the default switching frequency of 500 KHz, where $C_C$ is a constant value based on predetermined values and where $R_T$ is expressed in KΩ. In one embodiment, $R_D$ is 24 kilohms (KΩ). As illustrated by Table 1, each device is configured as a slave by coupling its PS pin to a resistor $R_P$ or as a master by coupling its PS pin to a fixed voltage having a sufficiently high voltage level, such as +5V. The coupling of the FS pin establishes the frequency of operation. As a master device, coupling the FS pin to a sufficiently high fixed voltage level, such as +5V, sets the switching frequency to a predetermined default frequency, such as 500 kilohertz (KHz). As a master device, coupling a resistor $R_T$ to the FS pin sets the frequency of oscillation ($f_{osc}$) in KHz according to the following equation 1:

$$f_{OSC} = \frac{C_C}{R_T} \text{ KHz} \quad (1)$$

In one embodiment as further described below, $C_C$ is 12,000 based on predetermined voltage reference values VREF1 and VREF2, a current scaling factor k1, and the capacitance of an oscillator capacitor $C_{OSC}$.

The FS pin of each slave device is also coupled to a resistor $R_T$ having the same resistance so as to extract the oscillator charging current information from the master device. This oscillator charging current is used in an internal ramp generator to achieve the correct peak-to-peak amplitude of a triangle ramp signal. The master device sends the master switching clock signal MCLK to the slave devices via the SYNC pin. For each slave device, a resistor $R_P$ coupled to the PS pin sets phase shift angle according to the following equation 2:

$$PH = \frac{1}{16} \cdot \frac{R_P}{R_T} \cdot 360^\circ \quad (2)$$

The minimum phase shift angle (maximum number of channels in multiphase application) is defined to limit the power loss in the multiphase voltage converter 200. In addition, the maximum number of phases that can be achieved depends on the phase error caused by process mismatch. As further described below, the worst case error in one particular embodiment for the phase shift angle is between 10-15%. Although this level of error is acceptable for a relatively small phase shift angle, this particular error limits the maximum number of phases since the slave devices with the larger phase shift angles have larger error spreads which increases the probability of phase activation overlap. For example, assuming a 10% error for an eight-phase embodiment, the seventh phase has a phase angle of 270+/−27 degrees and the last phase has a phase shift angle of 315+/−32 degrees, resulting in a potential overlap within the phase shift angle range of 283 to 297 (270+27=297 and 315−32=283). In the embodiments with this level of phase shift angle variation, a current sharing feature may be added to prevent simultaneous activation of phases.

Figure 3:
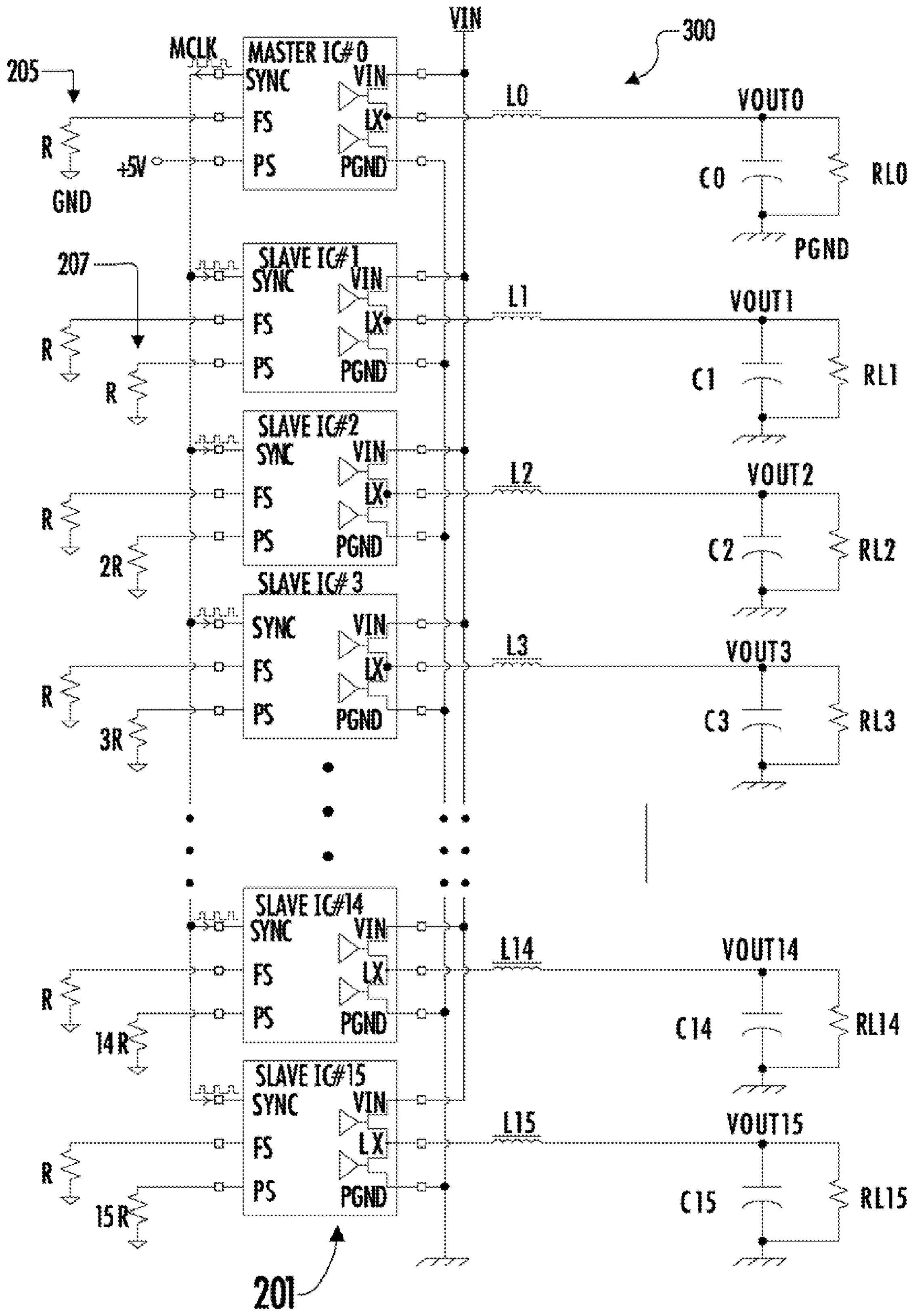
FIG. 3 is a simplified block diagram of a multi-channel voltage converter implemented according to an exemplary embodiment of the present invention.

FIG. 3 is a simplified block diagram of a multi-channel voltage converter 300 implemented according to an exemplary embodiment of the present invention. The multi-channel voltage converter 300 is similar to the multiphase voltage converter 200, except that it includes 16 channels 0-15, each controlled by a corresponding one of 16 voltage regulators 201, individually labeled Master IC #0, Slave IC #1, Slave IC #2, Slave IC #3, . . . , Slave IC #14, Slave IC #15. The LX pin of each voltage regulator 201 of the voltage converter 300 is coupled to one end of a corresponding one of 16 inductors L0-L15. The other end of each inductor L0-L15 is coupled to a corresponding one of sixteen output nodes developing corresponding output signals VOUT0-VOUT15. Sixteen output capacitors C0-C15 and sixteen load resistors RL0-RL1 are coupled between respective output nodes and PGND.

The voltage regulators 201 for the converter 300 operates in substantially identical manner to selectively switch its LX phase pin between VIN and PGND according to PWM operation at a frequency level determined by a master clock signal MCLK. The PWM switching operation converts the higher unregulated supply voltage VIN to the multiple regulated output voltages VOUT0-VOUT15. As before, the voltage regulators 201 are sequentially activated one at a time from the first master voltage regulator #0 to the last slave voltage regulator #15 and then back again to the master voltage regulator #0 in a round-robin fashion. Each slave voltage regulator #1-15 operates relative to the master voltage regulator #0 at a selected phase angle as further described below. The phase angle is effectively determined by the total number of phases. The relative level of input ripple current is determined by the total number of phases.

The FS pin of each voltage regulator 201 of the converter 300 is coupled to one end of a corresponding one of 16 resistors 205, each resistor 205 having its other end coupled to a signal ground GND. In the illustrated embodiment, each of the resistors 205 has the same resistance R. The SYNC pins of all of the voltage regulators 201 of the converter 300 are coupled together. The master voltage regulator #0 is configured as a master device in which it establishes the master switching clock MCLK, which is output on its SYNC pin. The remaining slave voltage regulators #1-15 are configured as slave devices which receive the MCLK signal at their SYNC pins as an input. The master voltage regulator #0 has its PS pin coupled to the fixed voltage level (e.g., +5V). The PS pin of each slave voltage regulator #1-15 is coupled to a corresponding one of 15 phase select resistors 207, each having its other end coupled to GND and having a resistance which establishes the relative phase of the respective slave device to the master as previously described. In the illustrated embodiment, the slave voltage regulator #1 has its PS pin coupled to a resistor 207 having a resistance R, the slave voltage regulator #2 has its PS pin coupled to a resistor 207 having a resistance 2R, the slave voltage regulator #3 has its PS pin coupled to a resistor 207 having a resistance 3R and so on up to the last slave voltage regulator #15, which has its PS pin coupled to a resistor 207 having a resistance 15R.

Configuration of switching frequency and phase shift angle is the same as described above in Table 1 and description thereof. The primary difference between the multiphase voltage converter 200 and the multi-channel voltage converter 300 is that the output stages of the converter 300 are separated and not coupled together as with the voltage converter 200. In this manner, any practicable number of channels may be implemented without concern for phase activation overlap as was the case for the voltage converter 200. And each additional channel further reduces the input current ripple.

Figure 4:
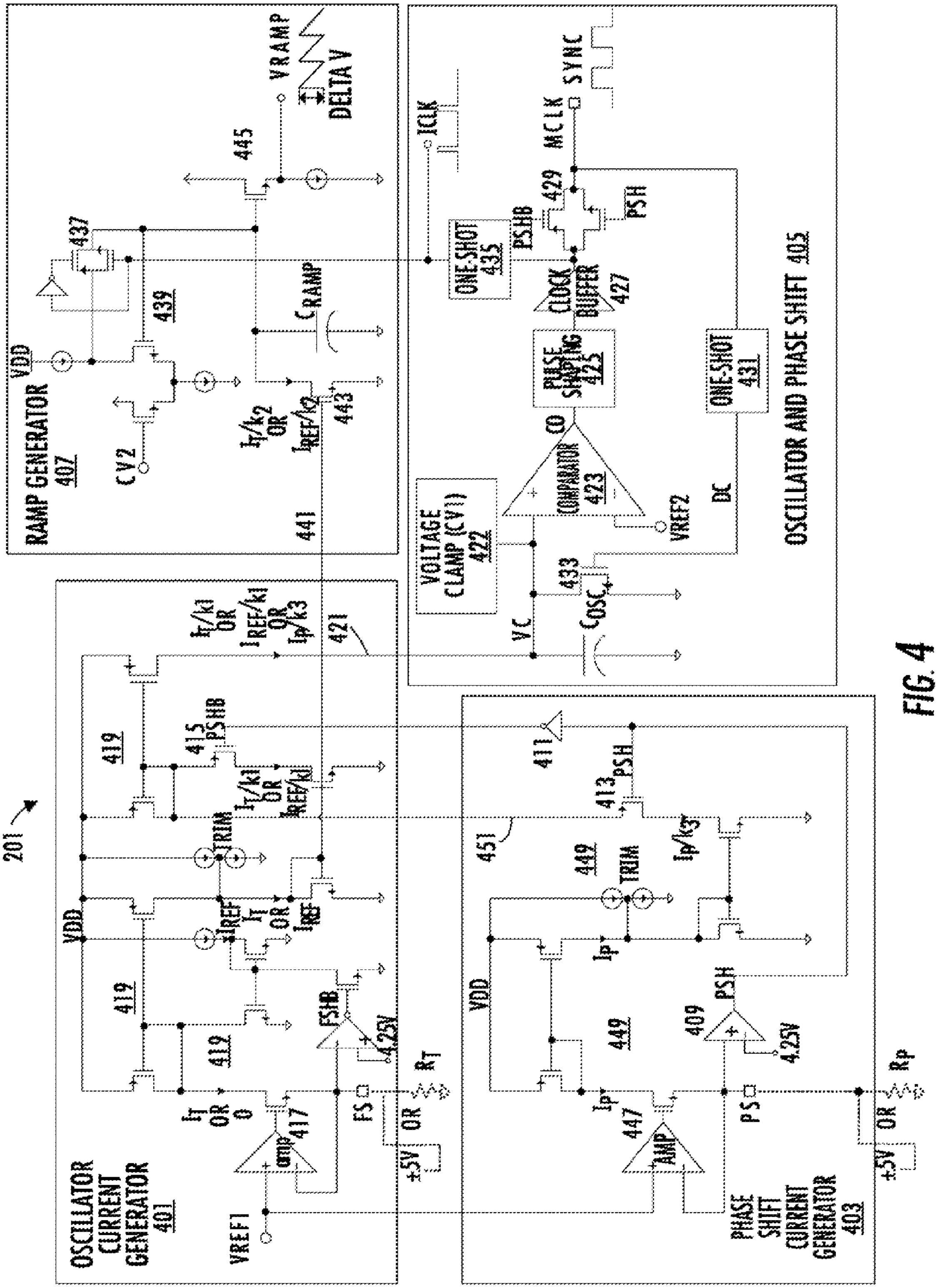
FIG. 4 is a simplified schematic diagram of an exemplary embodiment of the relevant portion of the voltage regulators of FIGS. 2 and 3.

FIG. 4 is a simplified schematic diagram of an exemplary embodiment of the relevant portion of the voltage regulator 201. The FS pin is shown coupled either to a resistor $R_T$ or to +5V and the PS pin is shown coupled to a resistor $R_P$ or to +5V, each selectable connection illustrated with dotted lines. The voltage regulator 201 includes an oscillator current generator 401, a phase shift current generator 403, an oscillator and phase shift circuit 405, and a ramp generator 407. The PS pin operates as a mode select pin or node for selecting operation between a master mode and a slave mode of operation. The FS pin operates as a frequency select pin or node for programming a frequency of operation (based on $R_T$) or for selecting a default frequency of operation (e.g., 500 KHz).

In a master mode of operation, assume the PS pin is coupled to +5V and that the FS pin is coupled to a resistor $R_T$. A comparator 409 within the phase shift current generator 403 asserts a phase shift signal PSH high, and an inverter 411 drives a PSHB signal low. The signals PSH and PSHB collectively operate as a mode select signal for selecting between the master and slave modes of operation. The comparator 409 operates based on a predetermined threshold voltage of 4.25V, although the particular voltage level is arbitrary and may be any suitable voltage level. A signal name with a "B" appended at the end indicates a negative logic signal unless otherwise indicated. The PSH signal turns off a P-channel transistor 413 and the PSHB signal turns on another P-channel transistor 415 within the oscillator current generator 401. When the resistor $R_T$ is coupled to the FS pin, an amplifier circuit 417 drives the FS pin to a reference voltage level VREF1, which causes a current $I_T$ to flow through the resistor $R_T$. The amplifier circuit 417 and the resistor $R_T$ collectively operate as a current generator to generate a current used to control the frequency of operation for the master mode of operation. The oscillator current generator 401 includes a configurable current mirror circuit 419, which generates a current $I_T$/k1 through a node 421 and into an oscillator capacitor $C_{OSC}$ located within the oscillator and phase shift circuit 405. The value "k1" is a current scaling factor. The capacitor $C_{OSC}$ charges and the voltage of the node 421, shown as a signal VC, rises at the appropriate rate. A voltage clamp 422 ensures that the voltage of the VC signal does not exceed a relatively high maximum voltage level, such as a clamp voltage level CV1. A comparator 423 holds its output low until the voltage of node 421 reaches another voltage reference level VREF2, at which time the comparator 423 asserts its output high.

The output of the comparator 423, shown providing a signal CO, is coupled to an input of a pulse shaping circuit 425, which provides a clock signal to an input of a clock buffer 427. The PSH and PSHB signals activate (or turn on) a switch 429, so that the buffered clock signal at the output of the clock buffer 427 is asserted as the MCLK signal onto the SYNC pin to be provided to the slave devices. The output of the clock buffer 429 is also provided to an input of a one-shot device 431, which asserts a DC signal at its output to the gate of an N-channel transistor 433. The drain of 433 is coupled to node 421 and its source is coupled to ground. In this manner, when the output of the comparator 423 goes high, the SYNC pin is pulled high activating the one-shot device 431, which asserts the DC signal high turning on the N-channel transistor 433 to quickly discharge the capacitor $C_{OSC}$. The one-shot device 431 and the transistor 433 collectively operate as a reset circuit for discharging the capacitor $C_{OSC}$. In this manner, the CO signal pulses high momentarily and goes back low again and the capacitor $C_{osc}$ begins to recharge and the process repeats to establish the frequency of the MCLK signal. The frequency of oscillation ($f_{osc}$) is determined by the resistance of the resistor $R_T$, the capacitance of the capacitor $C_{OSC}$ and the VREF1 voltage level in accordance with equation 1. As described further below, the capacitance of the oscillator capacitor $C_{osc}$ may be trimmed to compensate for process variations to improve accuracy. The pulse shaping circuit 425 increases the duty cycle of the CO signal to provide a suitable duty cycle for the MCLK signal.

The output of the clock buffer 427 is provided to the input of another one-shot device 435, having an output generating an internal clock signal ICLK. The ICLK signal pulses high to turn on a switch 437 within the ramp generator 407, which couples a ramp capacitor $C_{RAMP}$ to a clamp circuit 439, which quickly charges the capacitor $C_{RAMP}$ to another clamp voltage level CV2. The ICLK signal then goes back low decoupling the clamp circuit 439 from the capacitor $C_{RAMP}$, which is continuously discharged by a current level $I_T$/k2. The value "k2" is also a current scaling factor. A node 441 from the oscillator current generator 401 and coupled to the current mirror circuit 419 is coupled to the gate of an N-channel transistor 443 within the ramp generator 407, where the transistor 443 generates the discharge current $I_T$/k2 to form a ramp signal. The voltage of the capacitor $C_{RAMP}$, is provided through buffer circuit 445 to provide a ramp signal VRAMP. Since the ICLK signal is controlled by the output of the clock buffer 427, it discharges the capacitor $C_{RAMP}$ with each rising edge of the MCLK signal so that the VRAMP signal is synchronized with MCLK.

In the slave mode of operation, the PS pin is coupled to a resistor $R_P$ and the FS pin is coupled to the resistor $R_T$. In this case, an amplifier circuit 447 within the phase shift current generator 403 drives the PS pin to the voltage level VREF1, which is developed across the resistor $R_P$ to generate a current $I_P$. The amplifier circuit 447 and the resistor $R_P$ collectively operate as a current generator to generate a current used to control the phase shift for the slave mode of operation. The comparator 409 pulls the PSH signal low to turn on transistor 413 and the inverter 411 pulls the PSHB signal high to turn off transistor 415. The phase shift current generator 403 also includes a configurable current mirror circuit 449, which develops a current $I_P$/k3 through a signal node 451 and through transistor 413. The value "k3" is another current scaling factor. The $I_P$/k3 current is mirrored and provided through node 421 into the oscillator capacitor $C_{OSC}$. The comparator 423 operates in a similar manner driving the CO signal high when the node 421 reaches VREF2. The output of the clock buffer 427 drives the one-shot device 435 to generate the ICLK, and the ramp generator 407 operates in substantially identical manner to generate the VRAMP signal. The PSH and PSHB signals, however, turn off the switch 429 so that the output of the clock buffer 429 is not asserted onto the SYNC pin. Instead, the MCLK signal from a master device is provided to the one-shot device 431 to control discharge times of the oscillator capacitor $C_{OSC}$.

When the FS pin is coupled to +5V instead of the resistor $R_T$, then the current $I_T$ is zero and a reference current $I_{REF}$ is used instead. A comparator coupled to the FS pin within the oscillator current generator 401 operates based on a predetermined threshold voltage of 4.25V, although the particular voltage level is arbitrary and may be any suitable voltage level. If the PS pin is also coupled to +5V, then the $I_{REF}$ current replaces $I_T$ so that a current level of $I_{REF}$/k1 flows into the oscillator capacitor $C_{OSC}$. The $I_{REF}$ current is predetermined to establish a switching frequency of approximately 500 KHz for the master. If the PS pin is coupled to the $R_P$ resister and the FS pin is pulled to +5V, then the current $I_P$/k3 flows into the oscillator capacitor $C_{OSC}$ in the same manner as described above for the slave device, except that the SYNC pin takes the MCLK signal from the master device having the default frequency of 500 KHz. In any of these configurations, the current generated by the oscillator current generator 401 and provided to the oscillator and phase shift circuit 405 via node 421 serves as a control current or control signal.

Figure 5:
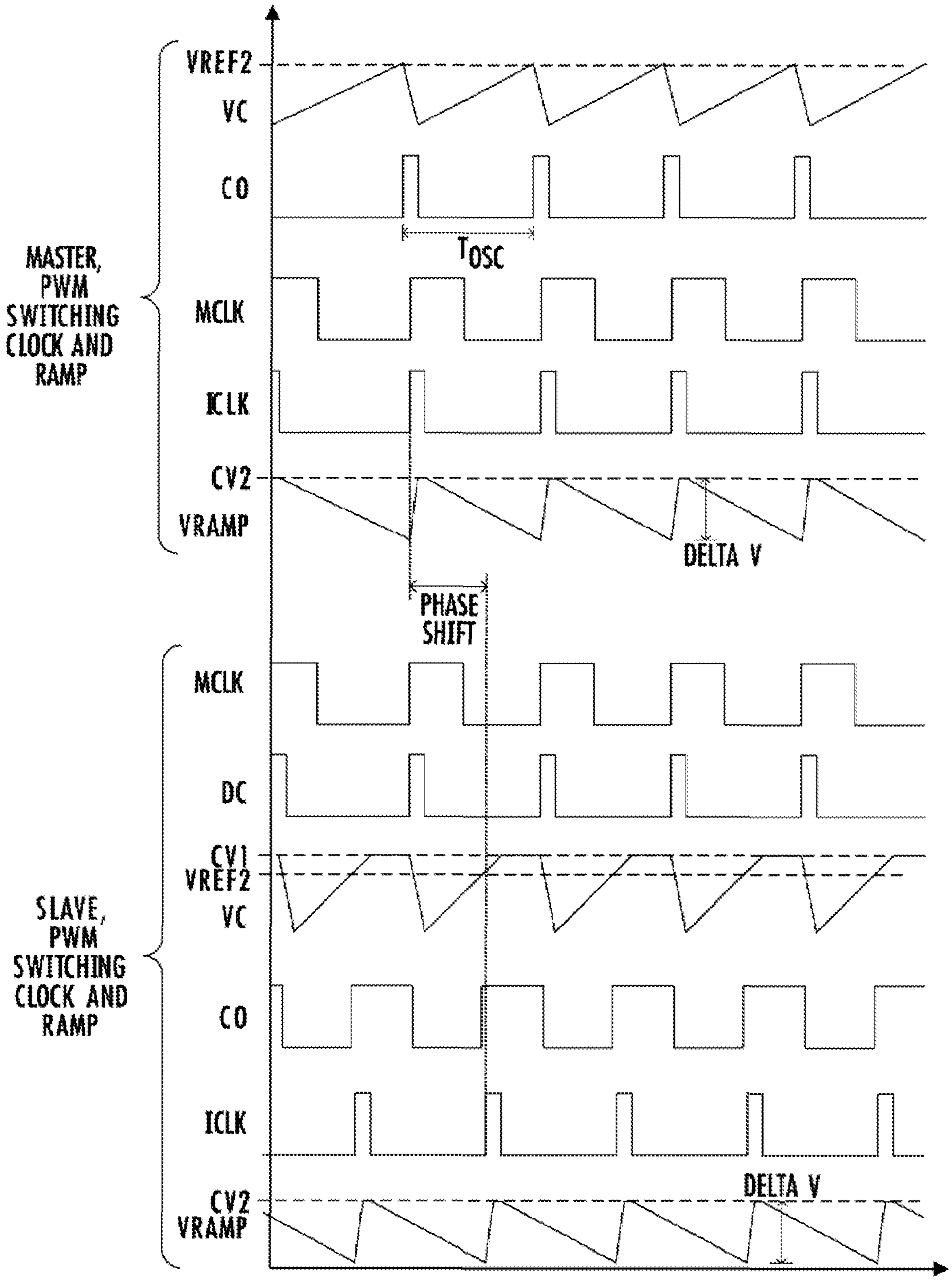
FIG. 5 is a timing diagram illustrating operation of the voltage regulator of FIG. 4 for both master and slave configurations.

FIG. 5 is a timing diagram illustrating operation of the voltage regulator 201 for both master and slave configurations. The master configuration plot is shown on top in which the VC, CO, MCLK, ICLK and VRAMP signals are plotted versus time. The VC signal is shown relative to VREF2 and the VRAMP signal is shown relative to the clamp voltage CV2. In each cycle, the VC signal ramps up until it reaches VREF2 and the CO signal goes high. The one-shot device 431 pulls the DC signal high to turn on transistor 433 to quickly discharge the capacitor $C_{OSC}$, so that the VC signal quickly ramps back down, which causes the comparator 423 to pull the CO signal low again. The pulses on the CO signal are processed by the pulse shaping circuit 425 to increase duty cycle resulting in the MCLK signal, which is output on the SYNC pin. The ICLK signal pulses synchronously with the CO signal and cause the $C_{RAMP}$ capacitor to be recharged when the ICLK signal goes high. The VRAMP signal then ramps down as the $C_{RAMP}$ capacitor discharges, so that the VRAMP signal is synchronous with the ICLK signal.

The slave plot configuration is shown at bottom in which the MCLK, DC, VC, CO, ICLK and VRAMP signals are shown plotted versus time. The VC signal is shown plotted relative to VREF2 and CV1 and the VRAMP signal is shown plotted relative to CV2. The MCLK signal is input from a master device and the one-shot device 431 pulses the DC signal at the rising edges of MCLK. The VC signal quickly ramps low as a result of discharging the capacitor $C_{OSC}$ with each pulse of the DC signal, and then ramps up based on the charging current $I_P$/k3. When the VC signal reaches VREF2 in each cycle, the comparator 423 pulls the CO signal high. In this case, the VC signal continues to rise above VREF2 since the switch 429 is off and the signal is not fed back to the one-shot device 431. Instead, VC rises until it reaches CV1 and stays at the CV1 voltage level until the capacitor $C_{OSC}$ is discharged when the DC signal goes high in response to the MCLK signal from the master device. The VC signal goes back low in response to each DC pulse, and the comparator 423 pulls the CO signal low. The ICLK pulses high synchronous with the rising edges of the CO signal, and the VRAMP timing is based on the ICLK signal as previously described. The ICLK signal of the slave device is shifted relative to the ICLK signal of the master device indicating the phase shift angle between the master and slave.

The synchronized phase shift is designed to minimize the phase shift error against process and temperature variations. The voltage references VREF1 and VREF2 may be bandgap voltages. In one embodiment, the capacitance of the oscillator capacitor $C_{OSC}$ is trimmed to minimize the mismatch error caused by internal capacitor variation. Phase shift angle is also a ratio of the external resistors $R_P$ and $R_T$, which also helps the phase shift angle immunity to external resistor value variation. Switching frequency calibration may be implemented by trimming the current charging the oscillator capacitor $C_{OSC}$ after it is trimmed.

Figure 6:
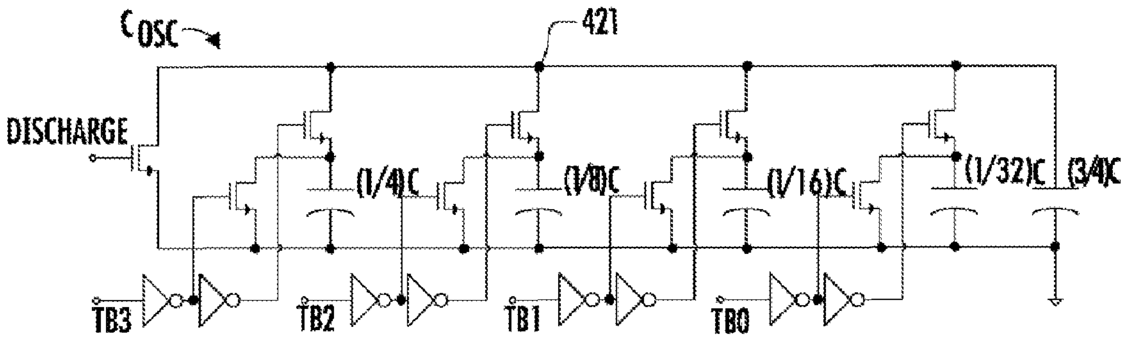
FIG. 6 is a schematic diagram of an exemplary embodiment of the oscillator capacitor including capacitance trim capability.

FIG. 6 is a schematic diagram of an exemplary embodiment of the oscillator capacitor $C_{OSC}$ including capacitance trim capability. The capacitance is trimmed to match the master with the slaves to minimize the phase shift error cause by capacitor process variations. The relative capacitance is established at node 421 relative to GND for each voltage regulator 201 and is set by trim bits TB0, TB1, TB2 and TB3. A capacitor weighted at (3/4)C is fixed between node 421 and GND, where C is a predetermined capacitance for determining the value of $C_{OSC}$. Each trim bit selectively couples a binary weighted capacitor in parallel with the fixed capacitor to add a selected amount of capacitance to trim $C_{OSC}$. The weighted capacitors in the illustrated embodiment include (1/4)C, (1/8)C, (1/16)C and (1/32)C, although other capacitance values and ranges are contemplated. In this manner the capacitance of $C_{OSC}$ is digitally trimmed via the trim bits TB0-TB3.

Figure 7:
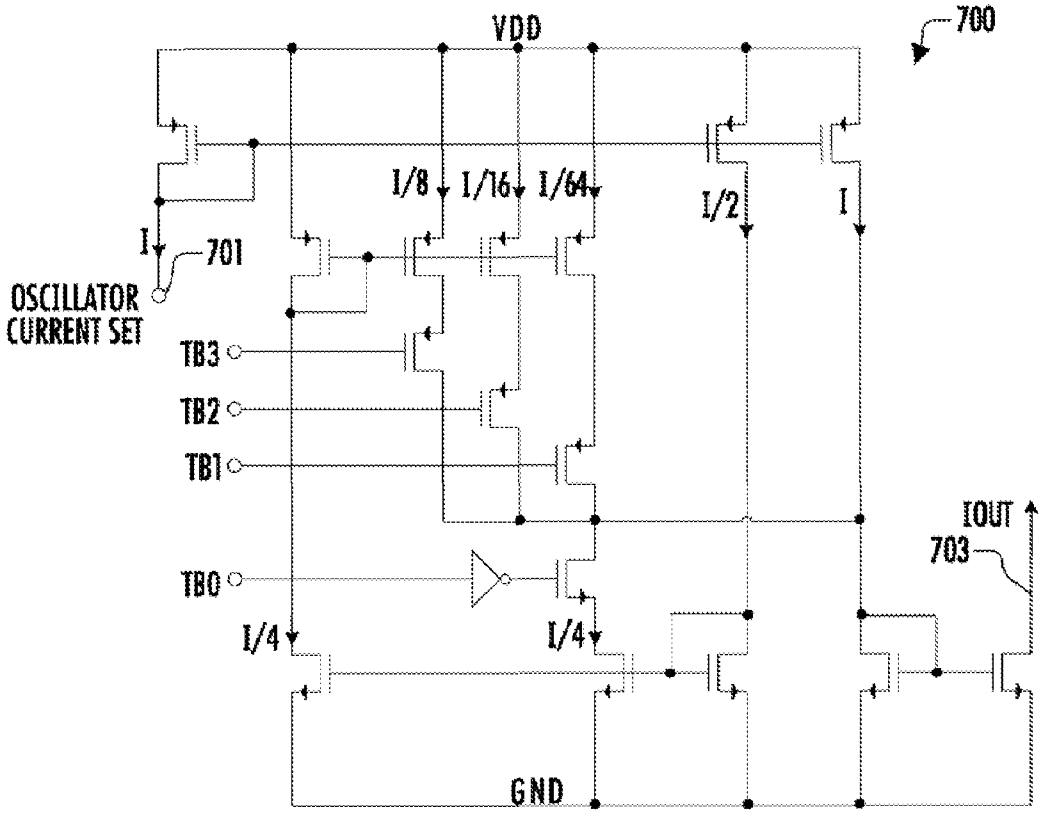
FIG. 7 is a schematic diagram of an exemplary embodiment of a current trim circuit for trimming the charging current of the oscillator capacitor.

FIG. 7 is a schematic diagram of an exemplary embodiment of a current trim circuit 700 for trimming the charging current of the oscillator capacitor $C_{OSC}$. A base reference current I is established at a node 701 and trim bits TB0-TB3 are used to establish the final current value output as current IOUT at node 703. The current I is trimmed according to the following equation 3 to trim the frequency of oscillation:

$$f_{OSC} = \frac{1}{VREF2 \cdot C_{OSC}} \tag{3}$$

The current trim circuit 700 may be employed by the current mirror circuit 419 as the TRIM circuit used to trim the control current (based on $I_{REF}$ or $I_T$) and/or by the current mirror circuit 449 to trim the phase current $I_P$. In any case the current is digitally trimmed using the trim bits TB0-TB3.

For the master device, the oscillator reference current is according to the following equation 4:

$$I_T = \frac{V_{ref1}}{R_t} \tag{4}$$

and the charging current to the capacitor $C_{OSC}$ in the oscillator is according to the following equation 5:

$$I_{CT} = \frac{I_T}{k_1} \tag{5}$$

In this case, the oscillator switching period is according to the following equation 6:

$$T_{OSC} = \frac{V_{ref2}}{I_{CT}} \cdot C_{OSC} = \frac{V_{ref2}}{V_{ref1}} \cdot k_1 \cdot R_T \cdot C_{OSC} \tag{6}$$

and discharging current to the capacitor $C_{RAMP}$ in the ramp generator 407 is according to the following equation 7:

$$I_{RAMP} = \frac{I_T}{k_2} \tag{7}$$

The triangle ramping period is according to the following equation 8:

$$T_{RAMP} = \frac{\Delta V}{I_{RANP}} \cdot C_{RAMP} = \frac{\Delta V}{VREF1} \cdot k_2 \cdot R_T \cdot C_{RAMP} \tag{8}$$

where ΔV is the PWM ramping signal peak-to-peak amplitude, where usually $T_{OSC}=T_{RAMP}$. Then, the following equation 9 is true:

$$\Delta V^* k2^* C_{RAMP} = VREF2^* k1^* C_{OSC} \quad (9)$$

For the slave, phase shift reference current is according to the following equation 10:

$$I_P = \frac{VREF1}{R_P} \quad (10)$$

and charging current to the capacitor $C_{OSC}$ in the phase shift is according to the following equation 11:

$$I_{CP} = \frac{I_P}{k_3} \quad (11)$$

Clock delay time when the IC works as a slave is according to the following equation 12:

$$\Delta T = \frac{VREF2}{I_{CP}} \cdot C_{OSC} = \frac{VREF2}{VREF1} \cdot k_3 \cdot R_P \cdot C_{OSC} \quad (12)$$

and phase shift angle PH is according to the following equation 13:

$$PH = \frac{\Delta T}{T_{OSC}} \cdot 360^\circ = \frac{VREF2_{SLAVE} \cdot VREF1_{MASTER}}{VREF2_{MASTER} \cdot VREF1_{SLAVE}} \cdot \frac{C_{OSC\_SLAVE}}{C_{OSC\_MASTER}} \cdot \frac{k_3}{k_1} \cdot \frac{R_P}{R_T} \cdot 360^\circ \quad (13)$$

The present invention provides a relatively simple and inexpensive open loop solution which avoids compensation and stability issues, and which provides a fast response. Only one pin is used to set the phase shift angle relative to the master. The phase shift angle can be adjusted linearly through an external resistor. The invention provides a wide switching clock frequency range. The slave clock tracks the master clock cycle by cycle. The implementation minimizes the error caused by process and temperature variations. In a more specific configuration, VREF1=0.6V, VREF2=2.5V, the triangle ramp peak-to-peak amplitude ΔV=2.5V, $C_{OSC}=C_{RAMP}=5$ picofarads (pf), and the current scaling ratios are k1=4, k2=4, and k3=¼.

The maximum number of phases in any multiphase application mainly depends on the phase shift error and the application requirement. If the device is used for multiphase configurations, the worst phase shift error is used to determine the maximum achievable number of channels. For an example, if phase shift variation comes out +/−10%*360° at the worst case after implementation, then the maximum channel in the multiphase application is limited to 6 phases while avoiding overlap problems. A current balance feature may be employed to avoid overlap problems and potentially allow a greater number of phases in the multiphase configuration. If the device is planned just to improve line input current ripple in a multiple channel application, phase shift error is not a limitation.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A clock synchronization circuit for a multiphase voltage regulator, comprising:

a first circuit having a mode select node for selecting between a master mode and a slave mode, wherein said first circuit provides a mode select signal indicative thereof;

a second circuit coupled to said first circuit, having a frequency select node and receiving said mode select signal, wherein said second circuit provides a control signal indicative of frequency of a master clock signal for said master mode and indicative of a phase shift relative to said master clock signal for said slave mode; and a third circuit, coupled to a master clock node and receiving said mode select signal and said control signal, which provides said master clock signal on said master clock node with a frequency based on said control signal for said master mode, and which generates a slave clock signal with said phase shift relative to said master clock signal received via said master clock node.

2. The clock synchronization circuit of claim 1, wherein said first circuit comprises:

a switch circuit, coupled to said mode select node, which provides said mode select signal to indicate said master mode upon detection of a first control voltage above a first threshold voltage on said mode select node, and which otherwise provides said mode select signal to indicate said slave mode; and a first current generator, coupled to said mode select node, which develops a first current based on resistance of a first resistor when said first resistor is coupled to said mode select node.

3. The synchronization circuit of claim 2, wherein said second circuit comprises:

a second current generator which develops a second current based on a resistance of a second resistor when said second resistor is coupled to said frequency select node, and which develops a predetermined reference current upon detection of a second control voltage above a second threshold voltage on said frequency select node; and a current mirror circuit which provides a control current as said control signal, wherein said control current is based on said first current when in said slave mode and said first resistor is coupled to said mode select node, wherein said control current is based on said second current when in said master mode and said second resistor is coupled to said frequency select node, and wherein said control current is based on said predetermined reference current upon detection of said second control voltage on said frequency select node.

4. The synchronization circuit of claim 3, further comprising a current trim circuit from trimming said control current.

5. The synchronization circuit of claim 4, wherein said current trim circuit is programmable using at least one trim bit, each said trim bit for selecting a binary weighted current.

6. The synchronization circuit of claim 3, wherein said third circuit comprises:

a capacitor receiving said control current;

a comparator circuit which compares a voltage of said capacitor with a reference voltage and which has an output providing a compare signal indicative thereof;

a second switch circuit responsive to said mode select signal that couples said output of said comparator circuit to said master clock node in said master mode and which isolates said output of said comparator circuit from said master clock node in said slave mode; and a reset circuit coupled between said master clock node and said capacitor which discharges said capacitor when said master clock node is pulled to a predetermined logic level.

7. The synchronization circuit of claim 6, wherein said capacitor comprises a trim capacitor.

8. The synchronization circuit of claim 7, wherein said trim capacitor is programmable using at least one trim bit, each said trim bit for selectively coupling a binary weighted capacitor to a fixed capacitor.

9. The synchronization circuit of claim 6, further comprising:

said current mirror circuit providing a ramp control signal based on said second current when said second resistor is coupled and based on said predetermined reference current upon detection of said second control voltage on said frequency select node; and a ramp generator having a first input coupled to said output of said comparator circuit, a second input receiving said ramp control signal, and an output providing a ramp signal having a frequency based on said master clock signal and a slope based on said ramp control signal.

10. An integrated circuit (IC) incorporating a multiphase voltage converter with synchronized phase shift, comprising:

a phase shift pin for selectively coupling one of a first voltage and a first resistor;

a frequency select pin for selectively coupling one of a second voltage and a second resistor;

a master clock pin which selectively provides a master clock signal or receives an external clock signal; and a voltage regulator which operates in a master mode if said first voltage is coupled to said phase shift pin and in a slave mode if said first resistor is coupled to said phase shift pin, wherein said IC provides said master clock signal in said master mode at a frequency determined by said second resistor if coupled to said frequency select pin or at a default frequency if said second voltage is coupled to said frequency select pin;

wherein said voltage regulator operates in said slave mode if said first resistor is coupled to said phase shift pin at a phase shift relative to said external clock signal based on said first resistor and said second resistor if coupled to said frequency select pin or based on said first resistor and a default resistance if said second voltage is coupled to said frequency select pin.

11. The IC of claim 10, wherein said first and second voltages are based on at least one voltage threshold.

12. The IC of claim 10, further comprising:

a signal generator, coupled to said phase shift pin and said frequency select pin, which provides a mode signal indicative of one of said master mode and said slave mode and which generates a control signal indicative of one of said first frequency and said default frequency when said voltage regulator operates in said master mode or indicative of said phase shift when said voltage regulator operates in said slave mode; and an oscillator circuit, coupled to said signal generator and said master clock pin, which generates an internal clock signal based on said control signal, wherein said internal clock signal is asserted as said master clock signal onto said master clock pin when in said master mode and wherein said internal clock signal is shifted by said phase shift relative to said external clock signal received via said master clock pin when in said slave mode.

13. The IC of claim 12, wherein said control signal comprises a current signal and wherein said oscillator circuit comprises a capacitor charged by said current signal.

14. The IC of claim 13, further comprising a current trim circuit for digitally trimming said current signal.

15. The IC of claim 13, wherein said capacitor comprises a digitally adjustable capacitor.

16. The IC of claim 13, further comprising a ramp generator which generates a ramp signal based on said internal clock signal having a slope based on said second resistor if coupled to said frequency select pin or based on said default resistance if said second voltage is coupled to said frequency select pin.

17. A method of configuring a multiphase voltage regulator integrated circuit (IC) with synchronized phase shift, comprising:

configuring a first pin of the IC to select between a master mode and a slave mode of operation and for programming a phase shift for the slave mode of operation;

configuring a second pin of the IC to select a frequency of operation;

generating an internal clock signal;

providing the internal clock signal as a master clock signal on a third pin of the IC at a selected frequency in the master mode of operation; and receiving an external master clock signal and operating the internal clock signal at a frequency based on the external master clock signal at the programmed phase shift in the slave mode of operation.

18. The method of claim 17, wherein said configuring the first pin of the IC comprises:

detecting a voltage level applied to the first pin above a predetermined threshold voltage to select the master mode of operation and otherwise to select the slave mode of operation; and if the slave mode of operation is selected, applying a predetermined voltage across a resistor coupled to the first pin to generate a current indicative of the programmed phase shift.

19. The method of claim 17, wherein said configuring the second pin of the IC to select a frequency of operation comprises:

detecting a voltage level above a predetermined threshold voltage applied to the second pin for selecting a default frequency of operation; and applying a predetermined voltage across a resistor coupled to the second pin to generate a current used to program the frequency of operation.

20. The method of claim 17, further comprising asserting trim bits to control an internal current level and an internal capacitance of the IC for controlling frequency of operation.

* * * * *